United States Patent [19]

Sato et al.

[11] Patent Number: 5,233,880
[45] Date of Patent: Aug. 10, 1993

[54] SPEED CONTROL SYSTEM FOR A VEHICLE HAVING A STEPLESS TRANSMISSION

[75] Inventors: Fumiki Sato; Kenzo Ushiro, both of Sakai, Japan

[73] Assignee: Kubota Corporation, Osaka, Japan

[21] Appl. No.: 833,371

[22] Filed: Feb. 10, 1992

[30] Foreign Application Priority Data

Jun. 14, 1991 [JP] Japan .................. 3-142817

[51] Int. Cl.⁵ .......................................... G05G 11/00
[52] U.S. Cl. ...................... 74/474; 74/479 R; 74/481; 74/483 R
[58] Field of Search ............... 74/473 R, 474, 475, 74/473 P, 479 R, 479 M, 479 ML, 479 MM, 481, 483 R

[56] References Cited

U.S. PATENT DOCUMENTS

| | | | |
|---|---|---|---|
| 3,645,368 | 2/1972 | Blaauw | 192/4 C |
| 3,898,891 | 8/1975 | Colloton | 74/474 |
| 4,341,129 | 7/1982 | Bando | 74/481 |
| 4,346,617 | 8/1982 | Schroeder et al. | 74/481 |
| 4,759,417 | 7/1988 | Wanie et al. | 180/6.34 |
| 4,958,535 | 9/1990 | Swartzendruber | 74/474 X |
| 4,977,760 | 12/1990 | Ishimori et al. | 60/444 |
| 5,062,510 | 11/1991 | Shimizu | 192/4 C |

FOREIGN PATENT DOCUMENTS

| | | |
|---|---|---|
| 2010734 | 9/1990 | Canada . |
| 2467098 | 4/1980 | France . |
| 2624449 | 12/1988 | France . |
| 56-19124 | 2/1981 | Japan . |
| 1497770 | 1/1978 | United Kingdom ............... 74/474 |

*Primary Examiner*—Allan D. Herrmann
*Assistant Examiner*—William O. Trousdell
*Attorney, Agent, or Firm*—Webb, Burden, Ziesenheim & Webb

[57] ABSTRACT

A running control system for a vehicle having a stepless transmission includes a displaceable drive arm connected to the stepless transmission, a control member such as a pedal shiftable within a predetermined range, a transmission mechanism for transmitting a shift of the control member to the drive arm, and a forward-backward selecting lever switchable between a forward mode and a backward mode. The drive arm has a forward range to one side of a neutral position, and a backward range to the other side of the neutral position. When the selecting lever is switched to the forward mode, the drive arm is displaced within the forward range by the shift of the control member within the predetermined range. When the selecting lever is set to the backward mode, the drive arm is displaced within the backward range by the shift of the control member within the predetermined range.

9 Claims, 3 Drawing Sheets

SPEED CONTROL SYSTEM FOR A VEHICLE HAVING A STEPLESS TRANSMISSION

BACKGROUND OF THE INVENTION

1. Field of the Invention

The present invention relates to an improvement in a control system for controlling a stepless transmission of a vehicle.

2. Description of the Related Art

Various control systems have heretofore been manufactured for controlling a stepless transmission of a vehicle. In one known example, as disclosed in U.S. Pat. No. 4,977,760, a pedal includes a front portion and a rear portion: the front portion is depressable forward to provide forward acceleration while the rear portion is depressable backward to provide backward acceleration. Another known system for controlling a stepless transmission is disclosed in U.S. Pat. No. 4,977,760 and in U.S. Pat. No. 4,759,417. This system includes two pedals, one for forward acceleration and the other for backward acceleration. The forward acceleration pedal is depressable forward to provide forward acceleration, and the backward acceleration pedal is depressable forward to provide backward acceleration.

The above control systems have the disadvantage of having to relocate a driver's foot for switching between forward drive and backward drive, which makes the control operation troublesome.

SUMMARY OF THE INVENTION

An object of the present invention is to provide a speed control system for a vehicle having a stepless transmission, which enables switching between forward drive and backward drive without relocation of a driver's foot.

The above object is fulfilled, according to the present invention, by a speed control system for a vehicle having a stepless transmission, comprising control means for controlling the hydrostatic transmission, the control means including a displaceable drive arm, a control member shiftable between a first position and a second position, transmission means for transmitting a shift of position of the control member to the drive arm, and forward-backward drive selecting means, switchable between a forward mode and a backward mode, for acting on the transmission means. The drive arm is displaceable within a first displacement region disposed to one side of a neutral position to drive the vehicle forward, and a second displacement region disposed to the other side of the neutral position to drive the vehicle backward. Thus, when the forward-backward selecting means is switched to the forward mode, the drive arm is displaced within the first displacement region by a shift of the control member from the first position to the second position. When the selecting means is switched to the backward mode, the drive arm is displaced within the second displacement region by the shift of the control member from the first position to the second position.

The above construction allows the vehicle to be accelerated forward and backward by means of a single control member, preferably a pedal. This facilitates an easier control operation.

Other objects and features of the present invention will be understood from the following description to be had with reference to the accompanying drawings.

DETAILED DESCRIPTION OF THE PREFERRED EMBODIMENT

Figure 1:
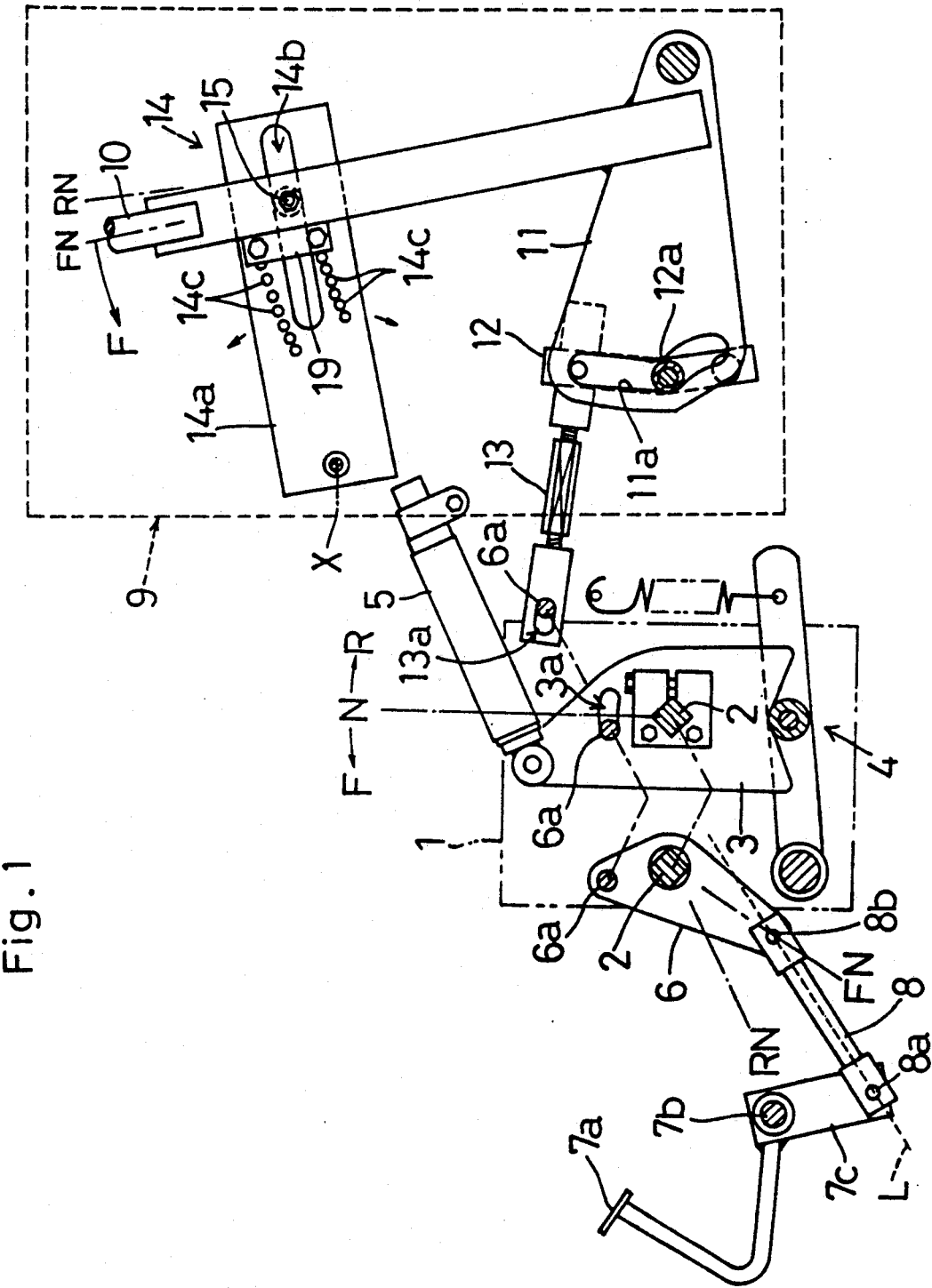
FIG. 1 is a side view of a speed control system with a switching mechanism set to a forward drive state.

A control system for controlling a hydrostatic transmission 1 will be described with reference to the drawings. The hydrostatic transmission 1 is housed in a transmission case, is driven by an engine mounted on a working vehicle to provide forward and backward speeds. As shown in FIG. 1, the hydrostatic transmission 1 is controlled by a trunnion shaft 2 to which a drive arm 3 is fixedly attached to be rotatable therewith. The drive arm 3 has a neutral position N, and is rotatable in an illustrated F direction from the neutral position N for forward acceleration, and in an illustrated R direction from the neutral position N for backward acceleration. The drive arm 3 defines a recessed cam surface on a bottom thereof. A pin for engaging this cam surface is attached to a pivotable arm urged upward. The cam surface and the pin constitute a neutralizing mechanism 4 for urging the drive arm 3, and thus the hydrostatic transmission 1, to the neutral position N. Numeral 5 in FIG. 1 denotes a damper to prevent a rapid return to the neutral position N of the drive arm 3.

As shown in FIG. 1, the trunnion shaft 2 carries a seesaw arm 6 mounted thereon to be rotatable independently of the trunnion shaft 2. An accelerator pedal 7a has an arm 7c rotatable therewith bout a pivotal axis 7b. A relay rod 8 is connected to a pivotal axis 8a at an end of the arm 7c opposite from the pivotal axis 7b. The other end of the relay rod 8 is connected to a pivotal axis 8b at one end of the seesaw arm 6. The seesaw arm 6 includes a pin 6a erected from the other end thereof, through which the seesaw arm 6 is interlocked to the drive arm 3. The drive arm 3 defines an engaging slot 3a for receiving the pin 6a. Thus, the drive arm 3 is operable by the accelerator pedal 7a through the engagement between the engaging slot 3a and pin 6a. The interlock between the accelerator pedal 7a and drive arm 3 has a play corresponding to the extent of the engaging slot 3a. The accelerator pedal 7a is the type operable in one direction, i.e. depressable forward only.

A forward-backward switching mechanism 9 will be described next. As shown in FIG. 1, the forward-backward switching mechanism 9 includes a switch lever 10 disposed in a driver's section to act as a switching device, and a switch arm 11 pivotable with the switch lever 10 on a common axis. A relay arm 12 is supported by the transmission case to be pivotable adjacent a distal end of the switch arm 11. The relay arm 12 includes an engaging pin 12a, while the switch arm 11 defines a cam slot 11a for receiving the pin 12a. An operating force is transmitted from the switch arm 11 to the relay arm 12 through the engagement between the cam slot 11a and engaging pin 12a. A connecting rod 13 is pinned to a distal end of the relay arm 12. The connecting rod 13 defines a connecting slot 13a in a forward end region thereof for connection to the pin 6a of the seesaw arm 6. When the switch arm 11 is operated forward, the relay arm 12 is caused, through the cam slot 11a, to pivot forward. When the switch arm 11 is operated backward, the relay arm 12 is caused, through the cam slot 11a, to pivot backward.

According o the above structure, when the switch lever 10 is pushed a fixed amount forward from a neutral position as shown in FIG. 1, the connecting rod 13 is moved through the switch arm 11 and the relay arm 12. Consequently, the connecting rod 13 pushes the seesaw arm 6, whereby the seesaw arm 6 pivots counterclockwise to an illustrated position FN. During this process, the engaging pin 6a only moves within the engaging slot 3a of the drive arm 3. Therefore the drive arm 3 makes no pivotal movement. Thus, the hydrostatic transmission 1 is maintained in the neutral position N. The counterclockwise pivotal movement of the seesaw arm 6 displaces the relay rod 8 to such a position that the phantom line L, shown in FIG. 1, along the relay rod 8 passes under the trunnion shaft 2. When, in this state, the accelerator pedal 7a is depressed, the arm 7c pivotable with the accelerator pedal 7a applies a torque to push the relay rod 8 toward the pivotal axis 8b. As a result, the seesaw arm 6 pivots counterclockwise to press the engaging pin 6a against a forward end of the engaging slot 3a. The drive arm 3 is thereby rotated forward to place the hydrostatic transmission 1 in a forward acceleration state F. During this operation, the engaging pin 6a merely shifts from the backward end to the forwarded end in the slot 13a defined in the connecting rod 13.

Figure 2:
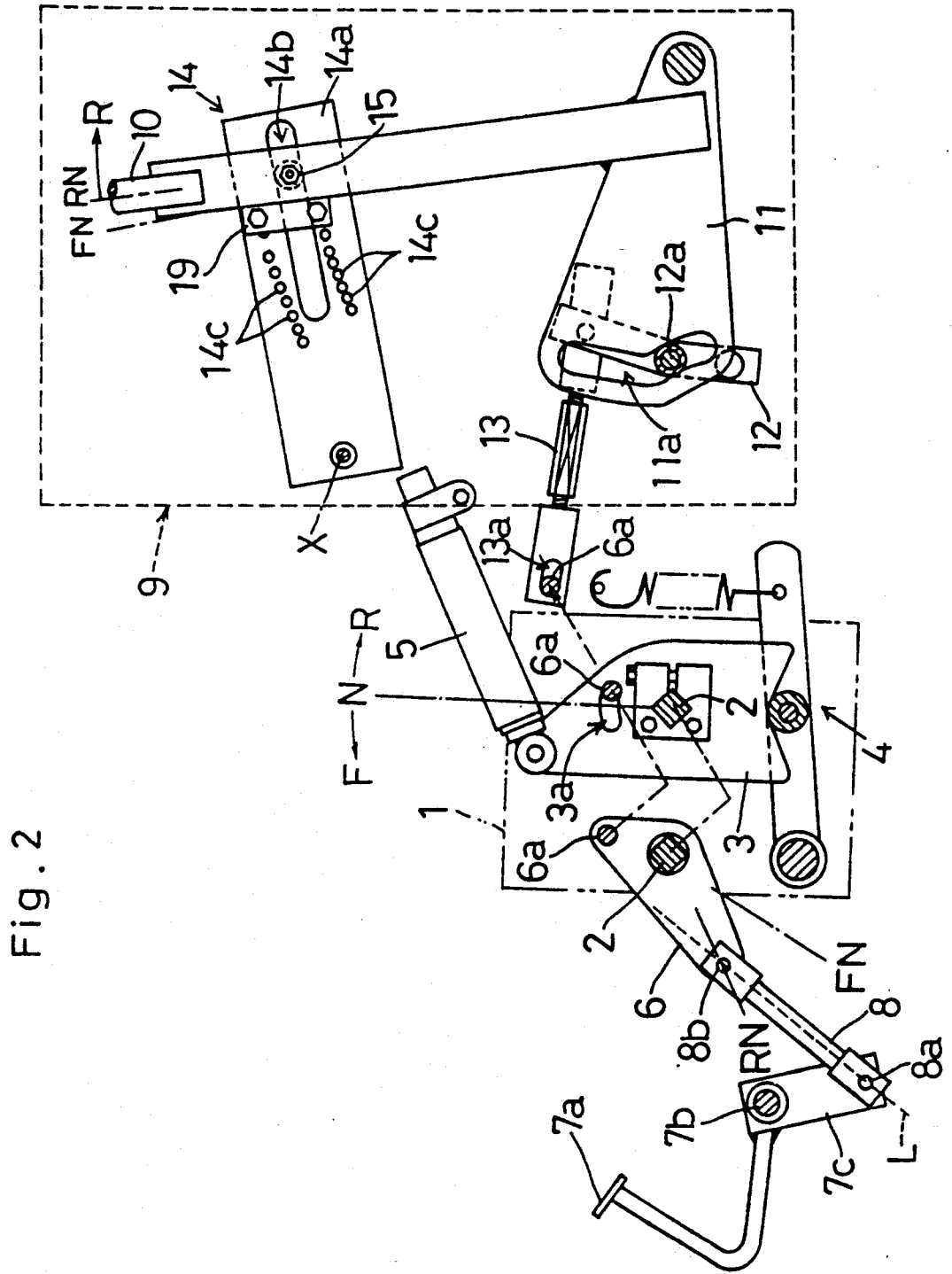
FIG. 2 is a side view of the speed control system with the switching mechanism set to a backward drive state.

When the switch lever 10 is operated a fixed amount rearward from the neutral position as shown in FIG. 2, the connecting rod 13 is moved through the switch arm 11 and the relay arm 12. Consequently, the connecting rod 13 pulls the seesaw arm 6, whereby the seesaw arm 6 pivots clockwise to an illustrated position RN. In this case also, the engaging pin 6a only moves within the engaging slot 3a of the drive arm 3, wherefore the drive arm 3 makes no pivotal movement. Thus, the hydrostatic transmission 1 is maintained in the neutral position N. The clockwise pivotal movement of the seesaw arm 6 displaces the relay rod 8 to such a position that the phantom line L, shown in FIG. 2, along the delay rod 8 passes over the trunnion shaft 2. When, in this state, the accelerator pedal 7a is depressed, the arm 7c pivotable with the accelerator pedal 7a applies a torque to push the relay rod 8 toward the pivotal axis 8b. As a result, the seesaw arm 6 pivots clockwise to press the engaging pin 6a against a rearward end of the engaging slot 3a. The drive arm 3 is thereby rotated backward to place the hydrostatic transmission 1 in a backward acceleration state R.

When the switch lever 10 is further operated from the illustrated FN position, the engaging pin 6a pushes the drive arm 3 to provide a selected high forward speed.

Figure 4:
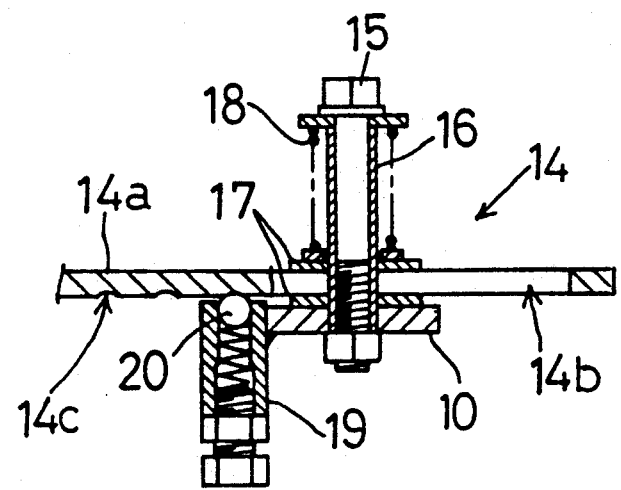
FIG. 4 is a plan view of a frictional retaining mechanism for the switch lever.

A frictional retaining mechanism 14, acting on the switch lever 10, will be described next. As shown in FIGS. 1 and 4, the frictional retaining mechanism 14 includes an elongate guide plate 14a extending along a moving track of the switch lever 10 and vertically pivotable about a horizontal axis X. The guide plate 14a defines a slot 14b. A bolt 15 and collar 16 extend from the switch lever 10 through the slot 14b. The collar 16 carries, mounted thereon, two friction plates 17 sandwiching the guide plate 14a in between, and a spring 18 for pressing the friction plates 17 upon the guide plate 14a. This frictional retaining mechanism 14 acts on an intermediate position of the switch lever 10, so that a smaller frictional retaining force will serve the purpose than when acting on a position of the switch lever 10 adjacent the pivotal point thereof. The slot 14b may be formed linearly since the guide plate 14a is vertically pivotable About the axis X, which facilitates manufacture. Further, the switch lever 10 carries a support frame 19 extending horizontally therefrom and supporting spring balls 20. The guide plate 14a defines arrays of engaging recesses 14c arranged along moving tracks of the spring balls 20 movable with the switch lever 10, so that the spring balls 20 are releasably engageable with the recesses 14c. Thus, the spring balls 20 and frictional retaining mechanism 14 are operable in combination to set the switch lever 10 to a selected position for a constant speed drive.

As illustrated, the engaging recesses 14c are arranged in two, upper and lower arrays, and the recesses 14c in the lower array are staggered from those in the upper array. Consequently, the engaging recesses 14c are in substance arranged close to one another to enable fine speed setting. Thus, the frictional retaining force of the frictional retaining mechanism 14 is reinforced by the engaging force of the spring balls 20.

Figure 3:
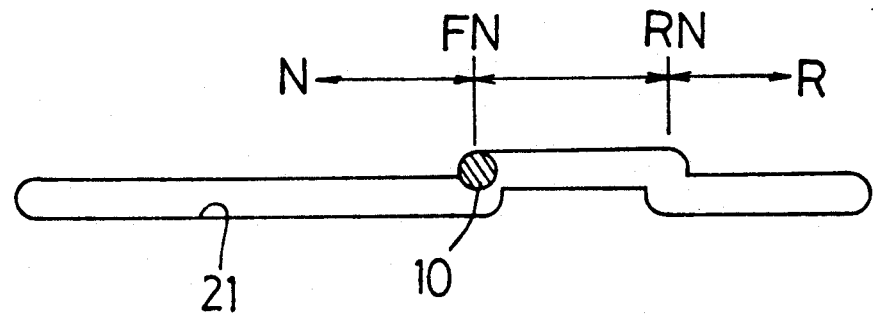
FIG. 3 is a plan view of a guide along which a switch lever is shiftable.

A guide plate for guiding operation of the switch lever 10 will be described. As shown in FIG. 3, the guide plate defines a guide 21 including an area corresponding to the neutral position FN-RN, which is offset from forward and backward acceleration areas. Thus, the switch lever 10 is manually operable in a varying direction forward or rearward from the neutral position.

As an example of a different embodiment, the seesaw arm 6 acting as an interlocking device may be replaced by a wire or the like. The switch lever 10 acting as a switching device may be replaced by a button-operated device, with the forward-backward switching mechanism 9 employing a hydraulic or electrical actuator.

What is claimed is:

1. A speed control system for a vehicle having a stepless transmission, comprising:

control means for controlling said stepless transmission, said control means including a rotatable shaft and attached drive arm displaceable within a first displacement region disposed to one side of a neutral position to drive the vehicle forward, and a second displacement region disposed to the other side of said neutral position to drive the vehicle backward;

a pivotable foot pedal shiftable between a first position and a second position;

a pivotable transmission means for transmitting a shift of said foot pedal to said drive arm through a rotation of said transmission means; and forward-backward drive selecting means for acting on said transmission means, said forward-backward drive selecting means including a switch lever shiftable between a forward position, a reverse position and at least one forward drive position, said forward-backward drive selecting means switching said transmission means between a forward mode when said switch lever is in said forward position in which said shaft and said drive arm are displaced within said first displacement region by a shift of said food pedal from said first position to said second position through a rotation of said transmission means in a first direction, and a backward mode when said switch lever is in said reverse position in which said shaft and said drive arm are displaced within said second displacement region by a shift of said foot pedal from said first position to said second position through a rotation of said transmission means in a direction opposite to said first direction, and when said switch lever is in one said forward drive position said shaft and drive arm are displaced to a corresponding position within said first displacement region.

2. A running control system as claimed in claim 1, wherein drive arm is angularly displaceable about a pivotal axis, and said transmission means is connected to said drive arm at a connecting point spaced from said pivotal axis, said connecting point being disposed relative to said pivotal axis such that the shift of said foot pedal results in a displacement of said drive arm in said first displacement region when said selecting means is switched to said forward mode, and in a displacement of said drive arm in said second shifting region when said selecting means is switched to said backward mode.

3. A running control system as claimed in claim 1, wherein said drive arm includes neutralizing means for urging said drive arm to said neutral position, and a damper to prevent a rapid return to said neutral position of said drive arm.

4. A running control system as claimed in claim 3, wherein said neutralizing means includes a recessed cam surface defined on said drive arm, a cam roller for engaging said recessed cam surface, and urging means for urging said cam roller to said recessed cam surface.

5. A running control system as claimed in claim 3, wherein said stepless transmission is a hydrostatic transmission.

6. A running control system as claimed in claim 1, wherein said forward-backward drive selecting means includes a frictional retaining mechanism acting on said switch lever to maintain said switch lever in a desired position.

7. A running control system as claimed in claim 6, wherein said frictional retaining mechanism includes an elongated guide plate extending along a moving track of said switch lever and defining a slot therein, a collar attached to said switch lever which carries a plurality of spring-biased elements which are biased against said guide plate.

8. A running control system as claimed in claim 1, wherein said pivotable transmission means includes a seesaw arm rotatably mounted to said swivel shaft said seesaw arm including a pin disposed away from said swivel shaft, and said seesaw arm pin engaging a first slot in said drive arm and a second slot in said forward-backward drive selecting means.

9. A running control system as claimed in claim 1, wherein said switch lever is shiftable to a plurality of forward drive positions.

* * * * *

UNITED STATES PATENT AND TRADEMARK OFFICE
CERTIFICATE OF CORRECTION

PATENT NO. : 5,233,880
DATED : August 10, 1993
INVENTOR(S) : Fumiki Sato, et al.

It is certified that error appears in the above-indentified patent and that said Letters Patent is hereby corrected as shown below:

Column 2 Line 37 "bout" should read --about--.

Column 3 Line 5 "o" should read --to--.

Column 3 Line 43 "delay" should read --relay--.

Column 4 Line 5 "About" should read --about--.

Claim 1 Line 64 Column 4 "food" should read --foot--.

Signed and Sealed this

Nineteenth Day of July, 1994

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,233,880
DATED : August 10, 1993
INVENTOR(S) : Fumiki Sato, et. al.

It is certified that error appears in the above-indentified patent and that said Letters Patent is hereby corrected as shown below:

Column 2 Line 37 "bout" should read --about--.

Column 3 Line 5 "o" should read --to--.

Column 3 Line 43 "delay" should read --relay--.

Column 4 Line 5 "About" should read --about--.

Claim 1 Line 64 Column 4 "food" should read --foot--.

Signed and Sealed this

Twentieth Day of September, 1994

Attest:

BRUCE LEHMAN

Attesting Officer     Commissioner of Patents and Trademarks